United States Patent
Skene

(10) Patent No.: US 12,358,840 B2
(45) Date of Patent: Jul. 15, 2025

(54) METHODS FOR PROCESSING INCINERATOR BOTTOM ASH

(71) Applicant: Recycl8 Ltd., Banchory (GB)

(72) Inventor: Ian Skene, Inverurie (GB)

(73) Assignee: Recycle8 Ltd., Aberdeenshire (GB)

( * ) Notice: Subject to any disclaimer, the term of this patent is extended or adjusted under 35 U.S.C. 154(b) by 0 days.

(21) Appl. No.: 17/998,905

(22) PCT Filed: May 14, 2021

(86) PCT No.: PCT/GB2021/051175
§ 371 (c)(1),
(2) Date: Nov. 15, 2022

(87) PCT Pub. No.: WO2021/229245
PCT Pub. Date: Nov. 18, 2021

(65) Prior Publication Data
US 2023/0183133 A1    Jun. 15, 2023

(30) Foreign Application Priority Data

May 15, 2020 (GB) ..................... 2007263

(51) Int. Cl.
*C04B 18/06* (2006.01)
*C04B 111/00* (2006.01)

(52) U.S. Cl.
CPC ... *C04B 18/067* (2013.01); *C04B 2111/00784* (2013.01)

(58) Field of Classification Search
CPC ......... C04B 18/067; C04B 2111/00784; C04B 18/06; C04B 18/023; Y02W 30/91
See application file for complete search history.

(56) References Cited

U.S. PATENT DOCUMENTS

| | | |
|---|---|---|
| 2007/0215010 A1 | 9/2007 | De La Roij |
| 2014/0000490 A1 | 1/2014 | De La Roij |
| 2017/0370050 A1 | 12/2017 | Townsend et al. |

FOREIGN PATENT DOCUMENTS

| | | |
|---|---|---|
| EP | 1349819 B1 | 9/2004 |
| EP | 1829840 A2 | 9/2007 |
| JP | 2003033748 A | 2/2003 |
| KR | 1020110091177 A | 8/2011 |
| WO | 0248067 A1 | 6/2002 |
| WO | 2011096605 A1 | 8/2011 |

OTHER PUBLICATIONS

J.A. Meima et al., "Carbonation processes in municipal solid waste incinerator bottom ash and their effect on the leaching of copper and molybdenum", Applied Geochemistry, Oct. 12, 2001, pp. 1503-1513.
S.Y. Nam et al., "Accelerated carbonation of municipal solid waste incineration bottom ash for CO2 sequestration", Geosystem Engineering, Oct. 30, 2012, pp. 305-311.
J. Roessler et al., "Use of Waste to Energy Bottom Ash as an Aggregate in Portland Cement Concrete: Impacts of Size Fractionation and Carbonation", Waste Biomass Valor, Mar. 31, 2016, pp. 1521-1530.
J. Roessler et al., "Use of Waste to Energy Bottom Ash as an Aggregate in Portland Cement Concrete: Impacts of Size Fractionation and Carbonation", Waste Biomass Valorization, Springer, Mar. 31, 2016, pp. 1-7.
PCT/GB2021/051175, "International Search Report", PCT, Sep. 1, 2021, pp. 1-3.
PCT/GB2021/051175, "Written Opinion of the International Searching Authority", Sep. 1, 2021, pp. 1-6.
P. Filipponi et al., "Physical and mechanical properties of cement-based products containing incineration bottom ash", Waste Management, Jan. 23, 2002, pp. 145-156.

*Primary Examiner* — Anthony J Green
(74) *Attorney, Agent, or Firm* — Kunzler Bean & Adamson

(57) ABSTRACT

A method for processing incinerator bottom ash (IBA) comprises the steps of carbonating IBA aggregate material by CO2 sequestration and providing a stabilizing additive for mixing with the carbonated IBA aggregate material, wherein the additive comprises one or more components from group (b1) and one or more components from group (b2), wherein group (b1) consists of aluminium chloride and at least one other metal chloride, and wherein group (b2) consists of silica, zeolite and apatite. When the carbonated IBA and additive is mixed a stabilized IBA composition is formed, the stabilized IBA composition being suitable for use as a substitute for traditional aggregates in the manufacture of concrete and concrete products.

22 Claims, 1 Drawing Sheet

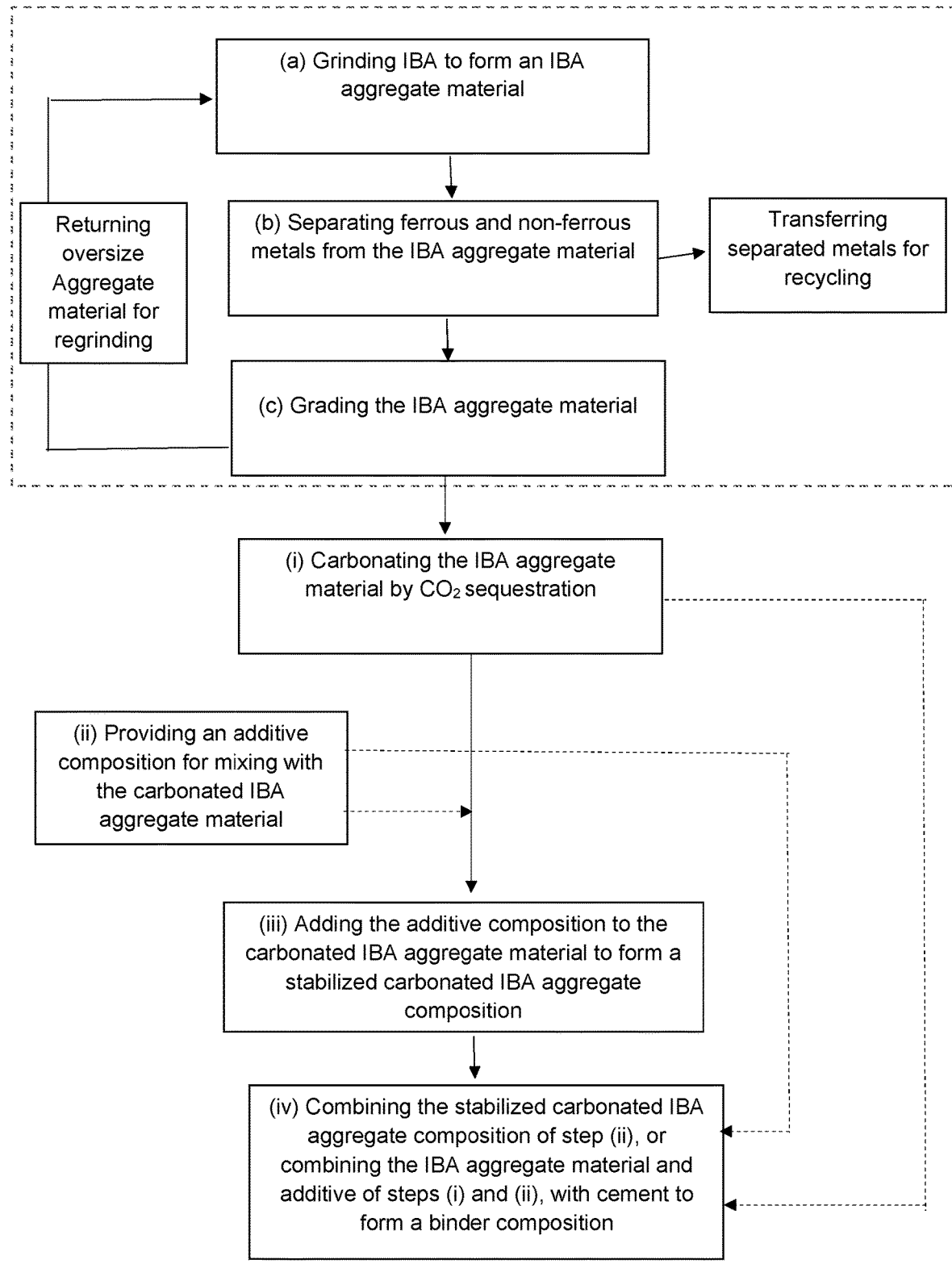

METHODS FOR PROCESSING INCINERATOR BOTTOM ASH

FIELD OF THE INVENTION

The present invention relates to methods for processing incinerator bottom ash (IBA) to produce a commercially useful aggregate binder material for the production of construction compositions.

BACKGROUND TO THE INVENTION

As landfill as a means of municipal solid waste (MSW) disposal has become increasingly less desirous there has been a significant increase in the amount of MSW that is sent instead to waste-to-energy plants such as incinerators. As landfill is gradually phased out as a MSW disposal method, there will be a future demand for increased incineration capacity. For example, in Scotland, it is estimated that annually 4,000,000 tonnes of MSW is disposed of in landfill. It is further estimated that when incinerated, the same quantity of MSW would produce approximately 750,000 tonnes of waste IBA and carbon dioxide ($CO_2$).

IBA is also known as Waste Incineration Bottom Ash, or "slag", and generally consists of 50% amorphous mass and 50% of other materials such as glass, ceramics, slag-like materials, metals and non-combusted organic material, and is formed during the combustion of domestic and comparable industrial solid waste.

The properties of IBA differs from other ash types, for example "E-fly" ash and E-bottom ash which are released from pulverised coal-fired power plants. E-fly ash is a fine powder consisting mainly of spherical glassy particles, and which is separated from flue gas flow by electrostatic filters. E-bottom ash, often referred to as 'boiler sand', is released as "heavy" ash particles during the pulverised coal combustion process.

Currently, waste IBA is landfilled, or finds use as a base in road construction or pipeline construction, however the issue of unstable heavy metals, for example copper (Cu) and molybdenum (Mo), leaching from this material and contaminating soil, groundwater and surface water presents a significant risk to the environment.

To help address this issue, carbonisation of IBA, or $CO_2$ absorption or sequestration by IBA, obtained from the incineration of MSW may be performed to change the mineralogical characteristics of the IBA material.

For example, in one study, "*Carbonation processes in municipal solid waste incineration bottom ash and their effect on the leaching of copper and molybdenum*"; Applied *Geochemistry* 17 (2002) 1503-1513, the interaction and absorption of $CO_2$ with samples of municipal solid waste incineration (MSWI) bottom ash and associated leaching during experimental artificial (i.e. accelerated) carbonation techniques and natural carbonation (i.e. weathering) was compared. The study found that laboratory carbonation of MSWI bottom ash to a pH of ~8.3 resulted in a reduction of more than 50% in Cu leaching and a reduction of less than 3% in Mo leaching. During natural weathering/carbonation, the leaching of Cu and Mo is further reduced because of the creation of additional sorption sites, which further reduce the mobility of these contaminants, however natural carbonation is a much slower process, taking place over a time scale of months to years.

In another study, "*Accelerated carbonation of municipal solid waste incineration bottom ash for $CO_2$ sequestration*"; *Geosystem Engineering*, Vol. 15, No. 4. December 2102, 305-211, found that the carbonation rate of bottom ash was at its highest at 20 C, a solid-to-liquid ration of 0.2 and with 20% $CO_2$, with the implication that $CO_2$ gas emitted from incinerators can be used directly as part of an accelerated carbonation process of bottom ash.

SUMMARY OF THE INVENTION

In an aspect of the present invention there is provided a method for processing incinerator bottom ash (IBA) comprising the steps of:
  (i) Carbonating IBA aggregate material by $CO_2$ sequestration; and
  (ii) providing a stabilizing additive for mixing with the carbonated IBA aggregate material, wherein the additive comprises one or more components from group (b1) and one or more components from group (b2), wherein group (b1) consists of aluminium chloride and at least one other metal chloride, and wherein group (b2) consists of silica, zeolite and apatite.

Optionally, the method for processing incinerator bottom ash (IBA) comprises the further step of:
  (iii) adding the additive to the carbonated IBA material to form a stabilized IBA composition.

Optionally, step (iii) includes mechanically mixing the additive with the carbonated IBA material.

Optionally, the additive is mixed with the carbonated IBA material as an aqueous solution.

Optionally, the at least one other metal chloride in group (b1) is selected from: sodium chloride, potassium chloride, magnesium chloride, calcium chloride, barium chloride, ammonium chloride, strontium chloride, and combinations thereof.

Optionally, the one or more components from group (b1) make up 70.0-99.0 wt. % of the total weight of the components (b1) and (b2).

Optionally, the one or more components from group (b2) make up 1.0-30.0 wt. % of the total weight of the components (b1) and (b2).

Optionally, the additive comprises 1 to 10% by weight of aluminium chloride; 45 to 90% weight of the at least one other metal chloride from group (b1); and 1 to 10% by weight of the components from group (b2).

Optionally, the additive further comprises one or more components from a group (b3), wherein group (b3) consists of magnesium oxide, calcium oxide and a combination thereof.

Optionally, the one or more components from group (b3) make up 5-40 wt. % of the total weight of components (b1), (b2) and (b3).

Optionally, the additive is ImmoCem® (Mega-Tech Holding B.V.)

Optionally, the additive is RoadCem® (Mega-Tech Holding B.V.)

Optionally, the additive is a mixture of ImmoCem® and RoadCem®.

Optionally, step (i) comprises exposing the IBA aggregate material to $CO_2$, wherein the $CO_2$ is atmospheric $CO_2$ and/or a from a non-atmospheric $CO_2$ source. Accordingly, carbonation may be natural, or accelerated, or a combination of both.

Optionally, step (i) comprises windrowing the IBA aggregate material.

Advantageously, step (i) matures the IBA aggregate material, and through sequestration of $CO_2$ by the IBA aggregate material, carbonates are formed within the IBA aggregate material.

Advantageously, step (iii) further stabilises and immobilises heavy metals in the carbonated IBA to form a stabilised IBA composition that mitigates leaching of said heavy metals from said stabilised IBA composition It will be understood that the term "$CO_2$ sequestration" refers to the removal of $CO_2$ from the atmosphere or a $CO_2$ source by the IBA, which may also be referred to as carbon sequestration by IBA carbonation.

Optionally, the IBA is an IBA aggregate. Optionally, the carbonated IBA is a carbonated IBA aggregate. Optionally, and the stabilised IBA composition is a stabilised IBA aggregate composition.

Optionally, the method for processing incinerator bottom ash (IBA) further comprises a step (iv) in which either the carbonated IBA aggregate material and additive of steps (i) and (ii), or the stabilised carbonated IBA aggregate composition of step (iii), is combined with cement to form a binder composition.

Optionally, step (iv) includes combining the carbonated IBA aggregate material and the additive of step (i) and (ii), or the stabilized carbonated IBA aggregate composition of step (iii), with cement in ratios, for example by weight and/or by volume, dependent upon the ultimately desired mechanical properties, for example but not limited to, tensile strength, compressive strength, or flexural strength of the intended construction composition, component or unit comprising said binder composition.

Optionally, the binder composition comprises: carbonated IBA aggregate in an amount of 50.0-70.0 wt %, based on the total weight of the binder composition; additive in an amount of 0.1-5.0 wt %, based on the total weight of the binder composition; and cement in an amount of 25.0-69.9 wt %, based on the total weight of the binder composition.

Optionally, wherein the binder composition comprises stabilized carbonated IBA aggregate and cement in a 70%/30% by weight and/or by volume ratio.

Optionally, the method for processing incinerator bottom ash (IBA) comprises the precursor processing steps of:
(a) grinding IBA to form IBA aggregate material;
(b) separating ferrous and non-ferrous metals from the IBA aggregate material; and
(c) grading the IBA aggregate material obtained from precursor step (a) or precursor step (b) into suitable size ranges for step (i).

Optionally, wherein precursor step (b) (separating ferrous and non-ferrous metals from the IBA aggregate material) optionally includes the sub-step of transferring the separated metals for metal recycling.

Optionally, wherein precursor step (c) (grading the IBA aggregate material) optionally includes the sub-steps of grading the IBA aggregate material to separate particles of greater than 28 mm in size, and optionally returning said particles to precursor step (a) for further grinding.

Optionally, wherein precursor step (c) (grading the IBA aggregate material) optionally includes grading the IBA aggregate material to separate particles of less than 28 mm, and preferably less than 25 mm, for step (i).

In accordance with a second aspect of the invention there is provided stabilized IBA aggregate formed in accordance with step (iii) of the method according to the first aspect of the invention.

In accordance with a third aspect of the invention there is provided a binder composition comprising cement and the stabilized IBA aggregate material of the second aspect of the invention, or cement and the carbonated IBA of step (i) and the additive of step (ii). Accordingly, the third aspect of the invention is a binder composition according to step (iv) of the method according to the first aspect of the invention.

In accordance with a fourth aspect of the invention there is provided a construction composition comprising a binder composition in accordance with the third aspect of the invention.

Optionally, the construction composition further includes an aggregate component in addition to the stabilized IBA aggregate of the present invention.

Optionally, the construction composition is concrete.

Optionally, precursor method steps (a) and (b) and (c) and associated optional sub-steps define an optional precursor phase of an IBA processing process in accordance with the invention.

Optionally, method step (i) defines a first phase of the IBA processing process.

Optionally, method step (iii) defines a second phase of the IBA processing process, this phase being an aspect of the invention when taken in isolation.

Optionally, method step (iv) defines a third phase of the IBA processing process, this phase being a separate, further aspect of the invention when taken in isolation.

It will be understood that the various phases can be conducted remotely from each other.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, the words "typically" or "optionally" are to be understood as being intended to indicate optional or non-essential features of the invention which are present in certain examples but which can be omitted in others without departing from the scope of the invention.

BRIEF DESCRIPTION OF THE DRAWING

FIG. 1 is an exemplary flow diagram showing an exemplary method of processing incinerator bottom ash in accordance with aspects of the invention.

DETAILED DESCRIPTION

With reference to FIG. 1, there is shown a flow diagram of exemplary methods and steps for processing incinerator bottom ash (IBA) in accordance with the invention.

In optional first (a) and optional second (b) precursor processing steps, dried bulk IBA obtained as a by-product from waste incineration is ground to form an IBA aggregate material, and ferrous and non-ferrous metal particles are separated from said IBA material for metal recycling. Suitable methods of grinding and for separating metal fractions from IBA materials, e.g. magnetic and non-magnetic separation techniques, are well known and therefore not discussed in further detail.

In a third optional precursor processing step (c), the ground IBA aggregate material obtained from precursor processing step (a) or precursor processing step (b) is graded into suitable particle size ranges for further processing. Optionally, step (c) includes the separation of IBA aggregate material having a particle size of 28 mm or greater, or more preferably still 25 mm or greater, from the remaining ground IBA aggregate material, which can be subsequently matured by carbonation in accordance with step (i). Optionally, the oversized IBA aggregate material particles that are separated from the ground IBA aggregate material are returned for re-grinding in accordance with precursor step (a). Suitable methods of grading the ground IBA aggregate material and separating oversize particles are well known and therefore not discussed in further detail.

Precursor processing steps (a), (b) and (c), and associated optional sub-steps, define an optional precursor phase of the IBA processing process in accordance with the invention.

In step (i), IBA aggregate material, optionally obtained from precursor step (c), is carbonated by $CO_2$ sequestration. In this step, the IBA aggregate material is exposed to $CO_2$. The $CO_2$ may be atmospheric $CO_2$, and/or non-atmospheric $CO_2$ obtained from a separate source. Accordingly, carbonation may be natural, or accelerated, or a combination thereof. To maximise exposure to $CO_2$ and speed up the carbonation process, the IBA material can be windrowed, or periodically turned over or moved. This step matures the IBA aggregate material, and carbonates are formed within said IBA aggregate material.

Carbonation results in a decrease of the IBA's pH in contact with water from approximately pH 12 to pH 9-10.5, as well as a reduction in the leaching of trace metals from the IBA as previously discussed.

The carbonated IBA aggregate material formed according to step (i), and any optional precursor steps, provides a bulk aggregate material in accordance with an aspect of the invention.

Once the IBA aggregate material has carbonated (i.e. 'matured') to a desired extent, which may be determined based on measurements of pH value, for example a pH of approximately 8.5, in a further step (iii) an additive composition, optionally provided in an intermediate step (ii), is added to the carbonated IBA aggregate material to form a stabilized IBA aggregate composition. Optionally, the additive composition is mixed with the matured IBA aggregate material as an aqueous solution. The so-formed stabilized IBA aggregate composition provides a stabilized IBA product in accordance with the invention.

A shown in the FIGURE, step (iii) can be performed as a discrete step to produce a stabilized carbonated IBA aggregate composition. However, as shown in the FIGURE, the step of adding the additive composition to the carbonated IBA aggregate material obtained from step (i) may be carried out simultaneously with the addition of cement in a variation of subsequent step (iv) as described below. This way stabilizing of carbonated IBA aggregate by the additive composition occurs during the mixing with cement in step (iv), rather than in a discrete step (iii).

The additive composition comprises one or more components from group (b1) and one or more components from group (b2), wherein group (b1) consists of aluminium chloride and at least one other metal chloride, and wherein group (b2) consists of silica, zeolite and apatite.

In examples, the at least one other metal chloride in group (b1) is selected from: sodium chloride, potassium chloride, magnesium chloride, calcium chloride, barium chloride, ammonium chloride, strontium chloride, and combinations thereof.

In examples, the one or more components from group (b1) make up 70.0-99.0 wt. % of the total weight of the components (b1) and (b2).

In examples, the one or more components from group (b2) make up 1.0-30.0 wt. % of the total weight of the components (b1) and (b2).

In examples, the additive comprises 1 to 10% by weight of aluminium chloride; 45 to 90% weight of the at least one other metal chloride from group (b1); and 1 to 10% by weight of the components from group (b2).

Optionally, the additive further comprises one or more components from a group (b3), wherein group (b3) consists of magnesium oxide, calcium oxide and a combination thereof.

Optionally, the one or more components from group (b3) make up 5-40 wt. % of the total weight of components (b1), (b2) and (b3).

Further detail of examples of the additive are found in European Patent No. EP 1 349 819 B1, the contents of which is incorporated herein by reference.

In examples, the additive composition is ImmoCem®, or RoadCem®, or a combination thereof. (ImmoCem® and RoadCem® are registered trade marks of Mega-Tech Holding B.V. and are manufactured by PowerCem Technologies B.V.).

Advantageously, the addition of the additive composition further stabilises and immobilises any heavy metals in the carbonated IBA aggregate to form a stabilised IBA aggregate composition which further mitigates leaching of said heavy metals from said stabilised IBA aggregate composition.

Optionally, the method for processing incinerator bottom ash (IBA) comprises the further step of (iv): combining either the carbonated IBA aggregate material and the additive composition of steps (i) and (ii), or the stabilised IBA aggregate composition of step (iii), with cement to form a binder composition.

Optionally step (iv) includes combining the carbonated IBA aggregate material and the additive of steps (i) and (ii), or the stabilized carbonated IBA aggregate composition of step (iii), with cement in ratios, for example by weight and/or by volume, dependent upon the ultimately desired mechanical properties, for example but not limited to, tensile strength, compressive strength, or flexural strength of the intended construction composition, component or unit comprising said binder composition.

Optionally, the binder composition comprises: carbonated IBA aggregate in an amount of 50.0-70.0 wt %, based on the total weight of the binder composition; the additive in an amount of 0.1-5.0 wt %, based on the total weight of the binder composition; and cement in an amount of 25.0-69.9 wt %, based on the total weight of the binder composition.

Optionally the binder composition comprises stabilized carbonated IBA aggregate and cement in a 70%/30% by weight and/or by volume ratio.

The so-formed binder compositions comprising cement, carbonated IBA aggregate material and additive composition provides a binder product in accordance with a third aspect of the invention.

In a further optional step (v), the binder composition(s) are formed into construction compositions, for example by the addition of water, and optionally by the addition of additional aggregate components, such as but not limited to sand or gravel.

In accordance with a fourth aspect of the invention there is provided a construction composition comprising the binder compositions in accordance with the third aspect of the invention. Optionally, the construction composition is concrete.

It will be understood that steps method steps (a) and (b) and (c) and associated optional sub-steps can be considered to define a precursor phase of an IBA processing process.

Method step (i) can be considered to define a first phase of the overall IBA processing process.

Step (iii) can be considered to define a second phase of the overall IBA processing process, this phase being an aspect of the invention when taken in isolation.

Step (iv) can be considered to define a third phase of the IBA processing process, this phase being a separate, further aspect of the invention when taken in isolation.

It will be understood that the various steps and phases of the overall IBA processing process can be conducted remotely and/or in isolation from one another.

When taken in isolation, the third phase defines a separate, further aspect of the invention.

When taken in isolation, the fourth phase defines a separate, further aspect of the invention.

Comparative tests performed 7 days after demoulding a series of moulded concrete sample cubes comprising: [a] water, traditional aggregate* and cement[†] only; [b] water, traditional aggregate*, cement[†] and stabilizing additive[‡]; [c] water, traditional aggregate*, cement[†] and carbonated IBA; and [d] water, traditional aggregate*, cement[†], carbonated IBA and stabilizing additive[‡]; where the presence IBA replaced approximately 60% of the traditional aggregate content by volume, showed that the mean measured compressive strength of concrete [c] (26.4 N/mm$^2$) and [d] (25.9 N/mm$^2$) i.e. formed in accordance with aspects of the present invention, was essentially identical to that of a traditional concrete mix [a] (29.3 N/mm$^2$) and a modified traditional mix [b] (29.0 N/mm$^2$). (*Thames Valley Aggregates 540, 541, [†] Dragon Alfa CEM 1, [‡]PowerCem Technologies B.V.).

Thus IBA aggregates in accordance with the invention have been found to be viable substitutes for traditional aggregates in the production of concrete products.

Advantageously, using IBA to form stabilized IBA aggregates for use in binder compositions for use in the manufacture of construction compositions such as concrete, reduces the amount of IBA being placed into landfill or used as road sub-base material.

Furthermore, sequestration of $CO_2$ by the IBA aggregate material from the atmosphere removes $CO_2$ from the atmosphere and locks it into the IBA material.

Advantageously, the use of said binder compositions in the manufacture of concrete products provides a reduced-cost concrete relative to concrete made wholly from conventional prior-art aggregates such as sand, gravel and crushed rock. Furthermore, through the replacement of conventional aggregates with stabilized IBA aggregate material in accordance with aspects of present invention, the requirement for mining virgin aggregate and/or cement is reduced.

The invention claimed is:

1. A method for processing incinerator bottom ash (IBA) aggregate material comprising the steps of:
   (i) carbonating IBA aggregate material by CO2 sequestration; and
   (ii) adding a stabilizing additive to, and mixing the stabilizing additive with, the carbonated IBA aggregate material to form a stabilized IBA composition, wherein the stabilizing additive comprises one or more components from group (b1) and one or more components from group (b2), wherein group (b1) consists of aluminium chloride and at least one other metal chloride, and wherein group (b2) consists of silica, zeolite and apatite.

2. The method for processing IBA aggregate material as claimed in claim 1, wherein the stabilizing additive is mixed with the carbonated IBA aggregate material as an aqueous solution.

3. The method for processing IBA aggregate material as claimed in claim 1, comprising the further step of (iii) mixing the additive with the carbonated IBA material to form a stabilized IBA composition.

4. The method for processing IBA aggregate material as claimed in claim 1, wherein carbonating the IBA aggregate material by CO2 sequestration comprises windrowing the IBA aggregate material.

5. The method for processing IBA aggregate material as claimed in claim 1, comprising the further step of (iii): combining the carbonated IBA aggregate material and the stabilizing additive of step (ii), or a stabilised carbonated IBA aggregate composition formed in step (ii), with cement to form a binder composition.

6. The method for processing IBA aggregate material as claimed in claim 1, wherein the at least one other metal chloride in group (b1) is selected from: sodium chloride, potassium chloride, magnesium chloride, calcium chloride, barium chloride, strontium chloride, and combinations thereof.

7. The method for processing IBA aggregate material as claimed in claim 1, wherein the one or more components from group (b1) make up 70.0-99.0 wt. % of the total weight of the components (b1) and (b2).

8. The method for processing IBA aggregate material as claimed in claim 1, wherein the one or more components from group (b2) make up 1.0-30.0 wt. % of the total weight of the components (b1) and (b2).

9. The method for processing IBA aggregate material as claimed in claim 1, wherein the additive comprises 1 to 10% by weight of aluminium chloride; 45 to 90% weight of the at least one other metal chloride from group (b1); and 1 to 10% by weight of the components from group (b2).

10. The method for processing IBA aggregate material as claimed in claim 1, wherein the additive further comprises one or more components from a group (b3), wherein group (b3) consists of magnesium oxide, calcium oxide and a combination thereof.

11. The method for processing IBA aggregate material as claimed in claim 10, wherein the one or more components from group (b3) make up 5-40 wt. % of the total weight of components (b1), (b2) and (b3).

12. The method for processing IBA aggregate material as claimed in claim 5, wherein the binder composition comprises: carbonated IBA aggregate material in an amount of 50.0-70.0 wt %, based on the total weight of the binder composition; additive in an amount of 0.1-5.0 wt %, based on the total weight of the binder composition; and cement in an amount of 25.0-69.9 wt %, based on the total weight of the binder composition.

13. The method for processing IBA aggregate material as claimed in claim 5, wherein the binder composition comprises carbonated IBA aggregate material and cement in a 70%/30% by weight and/or by volume ratio.

14. The method for processing IBA aggregate material as claimed in claim 1, further comprising the precursor processing steps of:
 (a) grinding IBA to form the IBA aggregate material;
 (b) separating ferrous and non-ferrous metals from the IBA aggregate material; and
 (c) grading the IBA aggregate material obtained from precursor step (a) or precursor step (b) into suitable size ranges for step (i).

15. The method for processing IBA aggregate material as claimed in claim 14, wherein precursor step (b) (separating of ferrous and non-ferrous metals from the IBA aggregate material) includes the sub-step of transferring the separated metals for metal recycling.

16. The method for processing IBA aggregate material as claimed in claim 14, wherein precursor step (c) includes the sub-steps of grading the IBA aggregate material to separate particles of greater than 28 mm in size, and optionally returning said particles to precursor step (a) for further grinding.

17. The method for processing IBA aggregate material as claimed in claim 16, wherein the precursor step (c) includes grading the IBA aggregate material to separate particles of less than 28 mm, and preferably less than 25 mm, for step (i).

18. The method of processing IBA aggregate material as claimed in claim 1, wherein step (i) of carbonating the IBA aggregate material by $CO_2$ sequestration is conducted until carbonation results in a decrease of the IBA aggregate material's pH in contact with water from approximately pH 12 to approximately pH 8.5-10.5.

19. The method of processing IBA aggregate material as claimed in claim 1, wherein step (i) of carbonating the IBA aggregate material by CO2 sequestration is conducted until carbonation results in a decrease of the IBA aggregate material's pH in contact with water from approximately pH 12 to pH 9-10.5.

20. The method for processing IBA aggregate material as claimed in claim 1, wherein step (i) of carbonating the IBA aggregate material by CO2 sequestration is conducted until the IBA aggregate material's pH is measured to be approximately 8.5.

21. A binder composition comprising:
 cement; and
 a stabilised carbonated IBA aggregate material comprising:
  a carbonated IBA aggregate material; and
  a stabilizing additive mixed with the carbonated IBA aggregate material, wherein the stabilizing additive comprises one or more components from group (b1) and one or more components from group (b2), wherein group (b1) consists of aluminium chloride and at least one other metal chloride, and wherein group (b2) consists of silica, zeolite and apatite.

22. A construction composition comprising:
 a binder composition, comprising:
  a carbonated IBA aggregate material;
  a stabilizing additive mixed with the carbonated IBA aggregate material, wherein the stabilizing additive comprises one or more components from group (b1) and one or more components from group (b2), wherein group (b1) consists of aluminium chloride and at least one other metal chloride, and wherein group (b2) consists of silica, zeolite and apatite; and
  cement; and
 an additional aggregate component.

* * * * *